(12) United States Patent
Sakamoto et al.

(10) Patent No.: US 6,653,600 B2
(45) Date of Patent: *Nov. 25, 2003

(54) HEATING TROWEL SUCH AS SOLDERING IRON

(76) Inventors: Atsunobu Sakamoto, 10-15, Minamiyama 3-chome, Shiroimachi, Inba-gun, Chiba 270-14 (JP); Kazuko Sakamoto, 10-15, Minamiyama 3-chome, Shiroimachi, Inba-gun, Chiba 270-14 (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/199,351

(22) Filed: Jul. 19, 2002

(65) Prior Publication Data

US 2003/0015512 A1 Jan. 23, 2003

Related U.S. Application Data

(63) Continuation of application No. 09/720,107, filed on Dec. 2, 2000, now Pat. No. 6,455,813.

(30) Foreign Application Priority Data

Apr. 20, 1999 (JP) ............................................. 11-150410
Jan. 7, 2000 (JP) .................................. PCT/JP00/00036

(51) Int. Cl.[7] ................................................ H05B 1/00
(52) U.S. Cl. ........................ 219/229; 219/238; 219/241
(58) Field of Search ................................. 219/229, 238, 219/241, 242, 240, 230, 231, 236, 237, 239; 228/51, 55

(56) References Cited

U.S. PATENT DOCUMENTS 6,455,813 B1 * 9/2002 Sakamoto et al. .......... 219/229

* cited by examiner

Primary Examiner—Teresa Walberg
Assistant Examiner—Vinod D. Patel
(74) Attorney, Agent, or Firm—Lewis T. Steadman, Sr.; Todd S. Parkhurst

(57) ABSTRACT

The present invention relates to heating trowel which processes by heat while observing the status of the working material, such as soldering iron, plastic welder, iron, hair iron and the like, and specifically it relates to heating trowel that could be used within few seconds from providing power.

A heating trowel comprises a heating wire made of metal plate such as iron chrome alloy and which is thinned to the limit that it could maintain shape, an electrical insulator which is a thin plate of aluminum nitride and the like having more than 10 times the heat conductivity of said heating wire, and a trowel tip/heat storage made from copper and the like having more than twice the heat conductivity of the aluminum nitride and the like and also having high heat capacity, and formed by sufficiently adhering these components closely by pressing and the like using a heat insulating supporter.

Also, it is divided into two to a bare heating trowel and a receiving heating device.

The control method comprises providing a fixed large amount of electricity for a fixed short period of time to a heating wire by operating a power switch once and rising the temperature of a trowel tip/heat storage rapidly and obtaining a desired temperature by pressing the switch for a simple countable number of times.

The heating trowel mentioned above could have 10 times larger heat value than the conventional one so that it could heat the trowel tip/heat storage having large heat capacity rapidly. Also, by rising the temperature of the trowel tip stepwise by switch operation, it could be controlled without a measurement device or a control mechanism. Also, when it reaches desired temperature, the stored heat is large so that it could be used without heating. Therefore, a bare heating trowel free of cords could be used.

5 Claims, 3 Drawing Sheets

HEATING TROWEL SUCH AS SOLDERING IRON

This application is a continuation of U.S. Ser. No. 09/720,107 filed Dec. 2, 2000 now U.S. Pat. No. 6,455,813. The parent application was filed with the United States Designed/Elected Office under 35 U.S.C. 371 claiming priority to Japanese Patent Application No. JP1999-150410 filed on Apr. 20, 1999. These applications are incorporated herein by reference.

FIELD OF THE INVENTION

The present invention relates to a so-called heating trowel which process the working material by heat while observing its status, such as soldering iron, plastic welder, iron, hair iron and the like, and specifically it relates to a heating trowel that could be used within a few seconds from providing power.

BACKGROUND OF THE INVENTION

Conventional heating trowels such as soldering irons are of simple structure which provides fixed electricity to fixed heating wire, and using it at a temperature of thermal equilibrium condition. In addition, trowels with large heat capacity are preferred, therefore the time needed for heating to appropriate temperature took from 3 to 5 minutes. There are trowels which require only about 30 seconds for heating, but it is small in heat capacity and is easy to overheat, therefore it needed very precise and expensive control mechanism.

Also there are soldering irons which use assistant heater working while a switch is pressed along with an ordinary heater, being conveniently used when the working material has large heat quantity. However, the user might lose track of time after 4 or 5 seconds of pressing the button, therefore in order to prevent overheating from overpressing, the heating ability must be weakened. Accordingly, it took 15 to 20 seconds to heat even when the assistant heater is used at the beginning.

The heater used in such heating trowels is made by winding a Nichrome wire to micaceous thin plate, or holding the wire between the thin plates. Therefore, the generated heat is only transferred slowly to the trowel tip, being obstructed by mica which is a superb heat insulator. Also, large temperature difference is needed, so that the heating wire is heated to near its melting point, making its life short.

There are trowels enabling process in a matter of seconds, such as a large module for soft soldering numerous terminals of IC or LSI with fixed shape at once by providing electric current of about 500 A. However, it is large in size, and could not conveniently be used in cases where shape and heat capacity of the working material change.

A trowel using ceramic heater made by baking metal oxides to ceramics such as aluminum oxide is utilized. However, because only small amount of electricity could be provided, the heat value per area is not so big. Also, the thermal conductivity of the aluminum oxide is in the same level as the stainless steel, so that it took time for the heat to reach the trowel tip/heat storage.

An aluminum nitride having high thermal conductivity has high sintering temperature, therefore it is technically difficult for the conductive material suitable for heating wire to be sintered firmly. Also, there is a difficulty in durability from thermal expansion and thermal shrinkage.

The conventional heating trowels therefore did not heat rapidly, so that danger arising from leaving the switch on such as forgetting about it while heating, forgetting to turn off the switch when interrupting work and almost catching fire, or being burnt from heated trowel tip and the like occurs many times. There is no inconvenience in working continuously for a long period of time. However, it is not suitable for using quickly on small amount of work, or for intermittent work. Therefore, there is a need for heating trowel that could be used immediately, and that could be controlled simply and inexpensively.

DISCLOSURE OF INVENTION

A heating trowel is comprised of a heating wire made of metal plate such as iron chrome alloy and which is thinned to the limit of maintaining its shape, an electrical insulator which is a thin plate of aluminum nitride and the like having more than 10 times the heat conductivity of the heating wire, and a trowel tip/heat storage made from copper and the like having more than twice the heat conductivity of the aluminum nitride and the like and also having high heat capacity, and formed by sufficiently adhering these components closely by pressing and the like using a heat insulating supporter.

The control method comprises providing a fixed large amount of electricity for a fixed short period of time to a heating wire by operating a power switch once and rising the temperature of a trowel tip/heat storage rapidly within the temperature range suitable for processing the working material, or in a temperature range of a half or one third of the suitable temperature range, and obtaining a desired temperature by pressing the switch for a countable number of times.

MODE FOR CARRYING OUT THE INVENTION

Figure 1:
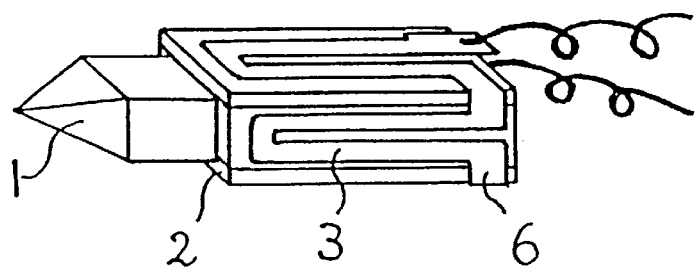
FIG. 1 is a perspective view showing one example of the present invention applied to a soldering iron.

FIG. 1 is a perspective view of the present invention which is applied as a heater for soldering iron, with heat insulating supporter and the like taken away for easier view. A trowel tip/heat storage 1 is a 4 mm square rod made from copper with its tip sharpened. To the trowel tip, a thin plate 2 of 0.6 mm thick made from aluminum nitride is placed, and the thin plate 2 is covered with a heating wire 3 of 0.1 mm thick, 2 mm wide made from narrow strip-like iron chrome ribbon which is wound for 25 mm in the lengthwise direction. In the actual application, it is covered with heat insulator such as glass cloth and the like which is adhered closely by being wound by a cover made from stainless steel and fixed, and provided with a handle which is the same as these or set up separately, so the usage is simplified.

Figure 2:
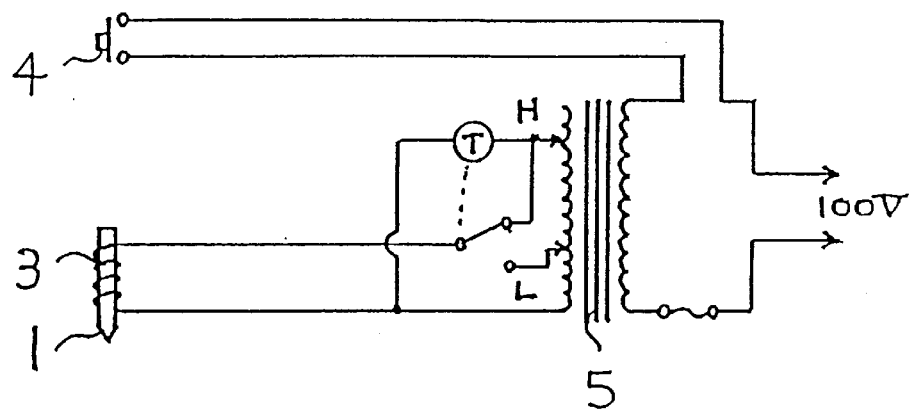
FIG. 2 is a power circuit diagram.

By connecting the lines of the soldering iron as is shown in circuit diagram of FIG. 2, and by pressing the push button switch 4, it is first charged with 28 V from the H terminal of a transformer 5 for the time set by a timer T, 1 second for example, and 14 A is supplied because the heating wire 3 is 2 Ω, and after 1 second it is charged with 8 V from the L terminal and 4 A is supplied. That is, it is heated with approximately 400 W with H terminal, and approximately 30 W with L terminal. The electricity is completely shut off by releasing the switch 4. By repeating for 3 times the process of pressing in the push button 4 and pressing it again after 1 second, soft solder near the trowel tip 1 started to melt after approximately 5 seconds.

Figure 3:
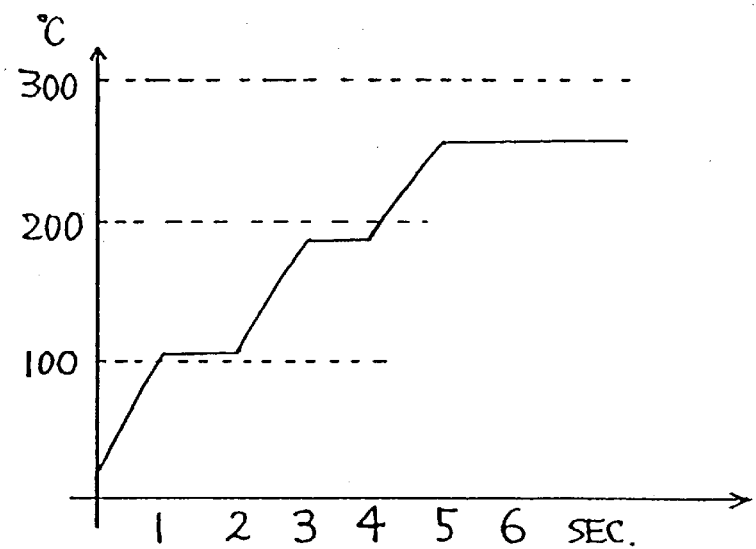
FIG. 3 is a heating graph of the soldering iron.

FIG. 3 is a graph taking temperature as a longitudinal axis, and time as a horizontal axis. The heating temperature at 400 W for 1 second is an average of approximately 80° C., which declines as the temperature becomes high. The temperature starts at the room temperature of 20° C., and becomes around 260° C. after third switch operation. This is the temperature of the heat storage adjacent to the heating wire. It takes 1 second for the heat to reach the trowel tip. When the voltage is switched to 30 W of the L voltage, the temperature reaches around 300° C. in approximately 3 minutes, therefore it is considered to be even at the unit of seconds, such as the case when the temperature drops by approximately 100° C. in 30 seconds when the electricity is shut off.

From this graph and from the condition of the soft solder, approximate temperature could be estimated. It may vary according to the combination, but the soft solder starts to melt around 190° C. shown by the dotted lines, and could be used at the temperature of 350° C. and up, so there is a sufficient range of suitable temperature. Therefore, this soldering iron can be used from the time when the soft solder starts to melt, and can be used again by pressing the switch once or twice when the soft solder stops melting. When the soft solder forms a ball after pressing the switch for 3 or 4 times and the processing becomes difficult, it is in the condition of overheat. With these measures, the heating trowel of the present invention could be used without control mechanism such as a sensor and the like.

This soldering iron uses conventional 40 to 60 W, however its input is nearly 10 times large. This is because the thermal conductivity of the aluminum nitride is nearly 5 to 10 times larger than iron chrome or Nichrome so that heat generated from heating wire could be absorbed rapidly, enabling 2 to 3 times larger than usual electricity to flow. The aluminum nitride transfers the heat rapidly to copper trowel tip having around twice the thermal conductivity. As another thermal conductor, when the working temperature or the price satisfies the requirements, silicon carbide or diamond and the like could be used.

In order for the generated heat to transfer from the heating wire made from iron chrome and the like and be absorbed rapidly by the heat storage made from aluminum nitride and copper, the thickness of the heating wire should be thin as possible while maintaining shape of the heating wire. A thin plate of 0.1 mm thick obtainable at present could sufficiently be used, when it is tempered to a suitable hardness. It should be made thin, hard and solid, so that when presswork is not possible, photo etching or wire cutting and the like could be carried out for processing.

From the above, the temperature of the heating wire is kept at a level slightly higher than that of the trowel tip and heat storage. Therefore, when the object temperature of the heating tool is below 400° C., for example, iron chrome and the like could be used as the material without the fear of tempering, so that life span is extended and heat insulating is simplified greatly. The material to be used is not limited to iron chrome, so that Nichrome, Kanthal alloy, platinum or other metals used for electric heat wires. Also, it could be made to generate heat over 500° C.

In order to transfer the generated heat to the trowel tip as quick as possible, heating should be done from many surrounding side walls as possible. For the square rod shown in FIG. 1, heating should be done from 4 side walls. However, heat is not absorbed in places where the metal heating wire is not adhered closely enough to the aluminum nitride, such as beam or corner of the trowel tip, so that it is insulated by air and the temperature becomes extremely high, and the wire may be burned out. In order to prevent overheating, the heating wire should be broadened by 2 to 5 times the width of heating portion so that heat generation is lowered, as shown in corner 6 of the heater 3 shown in FIG. 1.

Figure 4:
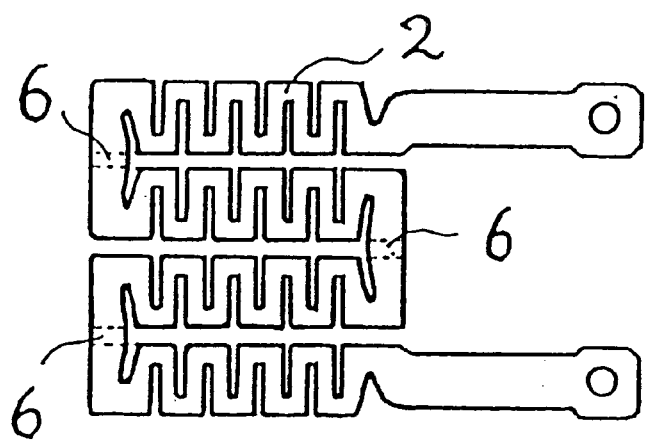
FIG. 4 is a plane view showing another shape of the heating wire.

Moreover, as shown in FIG. 4, the heater of the trowel tip shown in FIG. 1 could be made in a narrower zigzag shape by forming alternately from both sides numerous narrow slits vertical to the lengthwise direction of the ribbon made from iron chrome alloy and the like. For example, by forming slits of 0.2 mm wide, and making the width of the heating wire to be 0.4 mm, resistance became 25 Ω so that 100 V could be connected directly, and transformer could be omitted because electricity was narrowed down to 4 A. The zigzag portion should return after short distance as is shown in the figure, because it is easier to absorb expansion and contraction from the generation of heat by the heating wire, and also becomes stronger to deformation such as bending.

However, when the narrow width is widened abruptly, for example widened by 5 times to 2 mm, stress is centered to the narrow portion immediately before, making it easy to break. Therefore, the width should be changed by gradually widening or narrowing the width, as shown in FIG. 4.

It is difficult to control this heater during its rapid heating by feeding back the measurement of a sensor. However, it is possible during slow and level heating or during cooling, so that the heater could be equipped with, for example, a prevention device for over heating which prevents any heating over 350° C., or a circuit for lighting a signal when the temperature drops below 200° C. Moreover, for example, it could be formed so as to fix the heating time in the beginning, and the electricity provided is declined after reaching the suitable temperature so that ordinary temperature control could be obtained. In such case, heat value is constantly low when in use, so that great merit will be lost. Also, it is usually heated which leads to loss of energy, and the control device is expensive.

The control method of the present invention is as follows. The temperature change of the heating trowel, as shown in FIG. 3, could be regarded as climbing steps of temperature of approximately 80° C. in 1 switch operation for 3 times. By making this step smaller, 5 steps are needed at 50° C., 8 steps at 30° C. This makes the supply of heat more smoothly, however, number of pressing the switch needed to obtain the desired temperature climbs to 8 times. It remains in one digit number so it is not too difficult, but becomes rather troublesome.

The step could be made bigger to 200° C. in one step. However, by heating the heating trowel for 200° C. when not enough heat is obtained, soft solder is overheated so that processing is made difficult, and may provide bad influence on the confronting electric components and the like. Therefore, the step should be within the temperature range suitable for processing the working material. Preferably, it should be set at 70 to 80° C. from dividing the desired temperature by 2 or 3, so that it does not overheat when pressed excessively for 1 or 2 times. It only needs 3 or 4 pushing to obtain usable temperature from room temperature, so it is easy to operate.

Figure 5:
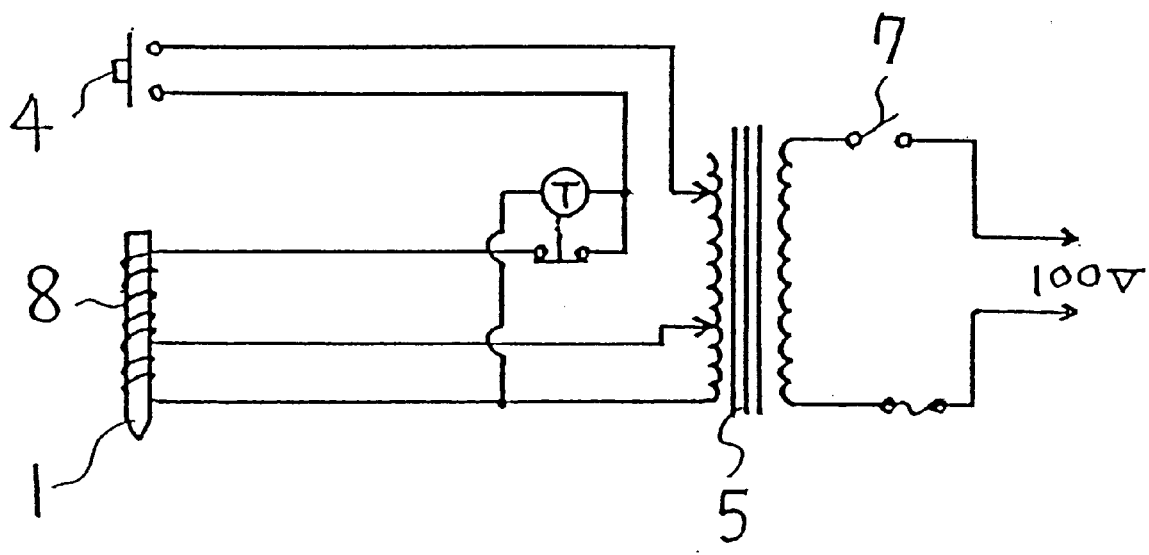
FIG. 5 is another circuit diagram.

The switch 4 of circuit in FIG. 2 serves also as a power switch, so that electricity is shut off by releasing the switch, making it convenient and safe in its own way. However, it could be formed a circuit where a power switch 7 is formed independently, and rapid heating is carried out separately from normal heating for a short period of time set by timer T with exclusive heating wire 8 by pressing the operation switch 4, as shown in FIG. 5. Moreover, disengagement of power plug could substitute the power switch. These are another variation of the present invention. The main factor is that fixed high heat block is generated when the circuit is given instruction by the switch.

Moreover, it may be formed so that the time and the degree of temperature rise during rapid heating and the heating strength during level heating is adjustable according to heat capacity, characteristics and the like of working material. In such case, the power control is not limited to transformer, but electronic control, preferably phase control using a thyristor or on-off control using zero-cross switch could be used. The electronic control is smaller in size, so that it could easily be installed inside the handle. The combination of these controls could be used. Also, not only commercial electricity but also a battery and the like could be used as the power source.

In order to simplify control, a timer could be omitted. A human could repeat relatively precisely a short period of time such as one second or so, which could be figured out by human sense from, for example, intervals of heart beats. The settled large amount of electricity could be flown into the heating wire by pressing the power switch for the short period of time mentioned above. The remaining circuit constant could be set according to the short period of time mentioned above, so the power-on movement should be repeated for a simple number of times. There may be some error caused from being based on human sense, but it could be used sufficiently by utilizing with observation of melting condition of the soft solder.

Figure 6:
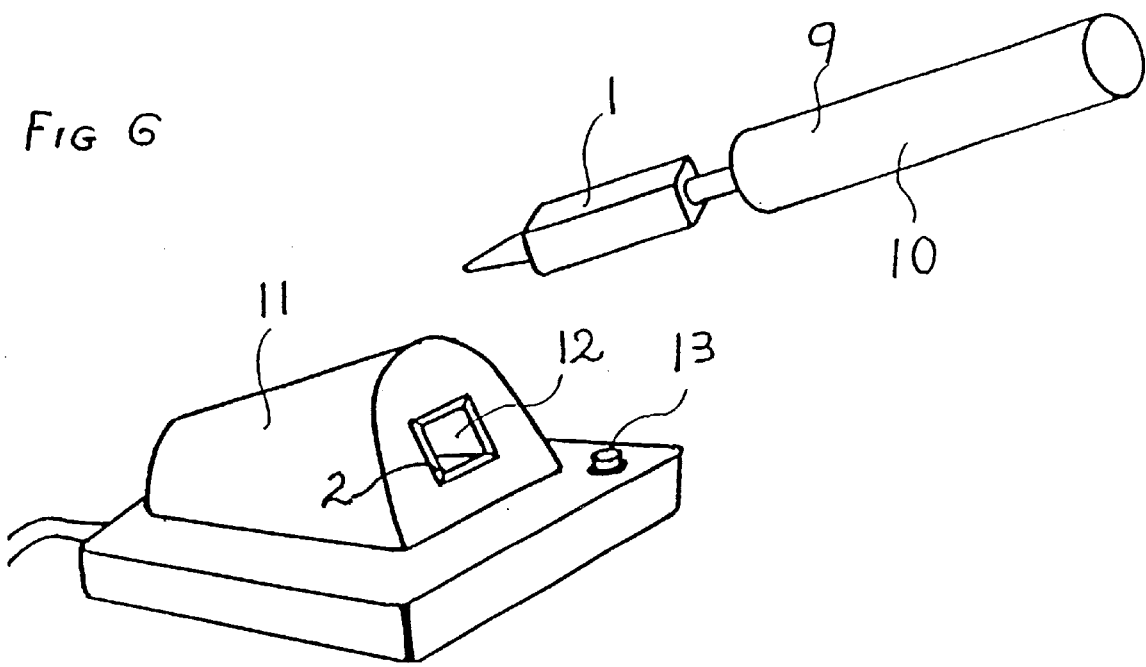
FIG. 6 is a perspective view showing a bare soldering iron and a receiving heating device.

It is essential for the heating trowels and its control method of the present invention to have large heat capacity at the trowel tip/heat storage. Therefore, it is convenient to divide the heat trowel in two, as shown in perspective view of FIG. 6. One portion may be a bare heating trowel 10, consisting of trowel tip/heat storage 1 with a handle 9, and removing the heating portion. The other portion may be a receiving heating device 11, consisting of remaining thin plate of thermal conductor such as aluminum nitride, and heating wire. Aluminum nitride and the like could be provided with a cover made from copper and the like for protection, but it should be small in terms of heat quantity. By composing an inlet 12 or a groove and the like, and contacting the bare heating trowel 10 closely by inserting or placing it to the receiving heating device, the trowel tip/heat storage 1 is heated.

From the above, the trowel tip/heat storage 1 could be made bigger, because the bare heating trowel 10 does not have heating portion or insulating supporters. Therefore, although the 4 mm square rod shown in FIG. 1 is big enough for actual use, it could be expanded so that the heat capacity is increased by several times, and it could be easier to use from being free of cords. Moreover, the receiving heating device 11 is easier to manufacture, because the limitation on size is lifted. The control method may be a conventional method or a stepwise heating method of the present invention. In the latter case, heating is accomplished by inserting the heat trowel 10 and pressing the power switch 13 several times.

The decision on whether the trowel tip/heat storage is big enough depends on whether the object work could be accomplished with the stored heat. When it is used for heat process of items that are small in size, the trowel may be small. However, the greater includes the lesser, therefore it is convenient to make it big as possible.

The above-mentioned examples were all concerning soldering irons. However, by changing the shape of the trowel tip and the temperature, almost the same could be said about plastic welders, irons, hair irons and the like.

Figure 7:
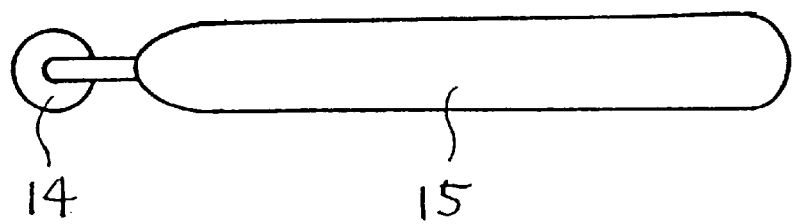
FIG. 7 is a plane view of a bare plastic welder.

For plastic welders, the temperature needed is approximately from 100° C. to 150° C., which is about half of the soldering iron, therefore the step of the heat, that is the temperature range during rapid heating should be around 30° C. The shape could be the same as the soldering iron, T-shaped, provided at the tip with a rotary disk 14 as is shown in plane view of FIG. 7 and the like, depending on the object of processing. The heating method, control and the like are equal to that of the soldering iron. Also, by dividing the welder in two as is shown in the prior example, forming one portion to be bare trowel 15 as is shown in FIG. 7 and forming another portion to be receiving heating device (not shown) for heating a thick copper disk 14, it could be made free of cords as well as made small in size, thereby making it a plastic welder very easy to use.

Industrial Applicability

With the present invention, the heating trowels could be readied in a couple of seconds that even a sensor cannot correspond, therefore it could be immediately used when needed, so a time loss could be eliminated. Moreover, there is no constant power supply, therefore there is no fear for a burn or a fire from the trowel tip. Also, there is no overheating, so that there is no excess use of energy, and the life of the heater and the trowel tip is increased.

Since it is not constantly heated, the size could be made small compared to the heat capacity. For the soldering iron, it could be made shorter. Therefore, induction device and supply device of soft solder could easily be added to the soldering iron, and adhesive stick supply device such as a glue gun could easily be added to the plastic welder, making it more convenient.

It is controlled with a simple circuit and not with precise sensors or expensive control device, therefore it could be manufactured inexpensively compared to performance. Especially, when the heating wire is provided narrow and long in a zigzag, the transformer is not needed with a power supply of 100 V or so, therefore the device is even more simplified.

When the heating trowel is divided into a bare heating trowel and a receiving heating device, each portion is easier to manufacture. Moreover, it enables bigger heat capacity, transformation to cord-free structure, easier change of trowel tip's shape, and easier operation.

Iron and hair iron and the like used in everyday life could be equipped with heater and control method of the heating trowel of the present invention. By enabling it to be used immediately when needed, and freeing it from preheating and excess heating, overall energy saved throughout Japan would be very large.

What is claimed is:

1. A heating apparatus comprising:
   a heat storing tip;
   an electrical resistance heating element for heating said tip;
   an electrical insulator positioned between said heating element and said tip;

said heating element comprising a thin plate of electrical resistance material which is either Nichrome or iron chrome;

said electrical insulator comprising a thermal conductor having heat conductivity 5 times or more greater than said heating element;

said tip having either copper or silver or an alloy and having copper or silver as a major ingredient; and said tip, heating element and electrical insulator being in close thermally conductive association.

2. A heating apparatus according to claim 1 wherein said electrical insulator comprises aluminum nitride.

3. A heating apparatus according to claim 1 wherein said electrical insulator comprises silicone carbide.

4. A heating apparatus according to claim 1 wherein said electrical insulator comprises diamond.

5. A heating apparatus according to claim 1 and including equivalents of iron chrome and nichrome including Kanthal alloy, platinum or other metals used for electric heat wires.

* * * * *